B. W. KADEL.
CAR TRUCK.
APPLICATION FILED FEB. 14, 1922.

1,414,961. Patented May 2, 1922.

Inventor
Byron W. Kadel
By Frank S. Mechlin
his Attorney

UNITED STATES PATENT OFFICE.

BYERS W. KADEL, OF BALTIMORE, MARYLAND, ASSIGNOR TO THE T. H. SYMINGTON COMPANY, OF NEW YORK, N. Y., A CORPORATION OF DELAWARE.

CAR TRUCK.

1,414,961. Specification of Letters Patent. Patented May 2, 1922.

Application filed February 14, 1922. Serial No. 536,455.

*To all whom it may concern:*

Be it known that I, BYERS W. KADEL, a citizen of the United States, residing at Baltimore city, in the State of Maryland, have invented certain new and useful Improvements in Car Trucks; and I do hereby declare the following to be a full, clear, and exact description of the invention, such as will enable others skilled in the art to which it appertains to make and use the same.

My invention relates to car trucks and more particularly to a type of truck wherein the side frame members on opposite sides of the truck are connected in a manner permitting them to execute a yieldingly resisted relative movement longitudinally of the truck, thereby minimizing the shocks and strains transmitted to the truck structure incident to its passage around curves, over switch points or because of irregularities in the truck or the truck wheels.

Car trucks now in service are of two classes, namely, rigid trucks and flexible trucks. In rigid trucks the side frame members thereof are rigidly connected by a member or members extending between the side frames. In this type of truck therefore, the side frames are incapable of any appreciable movement relative to each other longitudinally of the track without imparting great deforming strains to the truck parts and especially to the connections between the side frames, and as a result much trouble is experienced in keeping the bolts and rivets tight and breakage of the side frames frequently occurs. The car axles in this type of rigid truck are maintained substantially at right angles to the side frames and the binding of the truck wheels in the gage of the track on curves is thereby decreased.

In trucks of the flexible type relative longitudinal movement of the side frame members is freely permitted to the full extent of flexibility the truck is designed to possess. This unrestrained relative movement of the side frame relieves those members and the associated truck parts with which they are connected of the severe shocks to which they would be subjected in service if rigidly united and thereby reduces breakage of truck parts and lessens the rate of truck deterioration, but these advantages are attained at the expense of high train resistance and severe wheel flange and rail wear incident to binding of the truck wheels upon the rails.

The primary object of my invention broadly stated, is to provide means for yieldingly resisting the forces which tend to change the normal angular relation between the side frames and the truck axles, said means being adapted to restore the parts to their normal positions when the distorting or deforming forces cease to act.

The principal feature of the invention by which this object is accomplished consists in operably associating with the journal boxes and side frames a yieldable means adapted to become energized upon displacement of said side frames from normal position, said energized means serving to restore the side frames and connected parts to normal position upon cessation of the forces producing the displacement.

Another feature of my invention is to provide means for swingingly connecting each journal box to the respective side frame members, in the nature of a loose pivot and arranging a plurality of spring devices about said pivot or swinging connection for resisting angular deflection from normal position of the truck parts, said means being arranged to act as a couple for preventing undue strains and friction between said side frames and journal boxes.

A further feature of the invention consists in the provision of relatively separate and independent truck squaring mechanism associated with each axle and journal box of the truck, and operably connected for actuation by the longitudinal displacement of the side frame members from normal position.

There are other features of invention residing in the arrangement, construction and combination of the several parts, as will hereinafter appear.

In the drawings which illustrate an embodiment of my invention, the scope whereof is pointed out in the claims:

Figure 1:
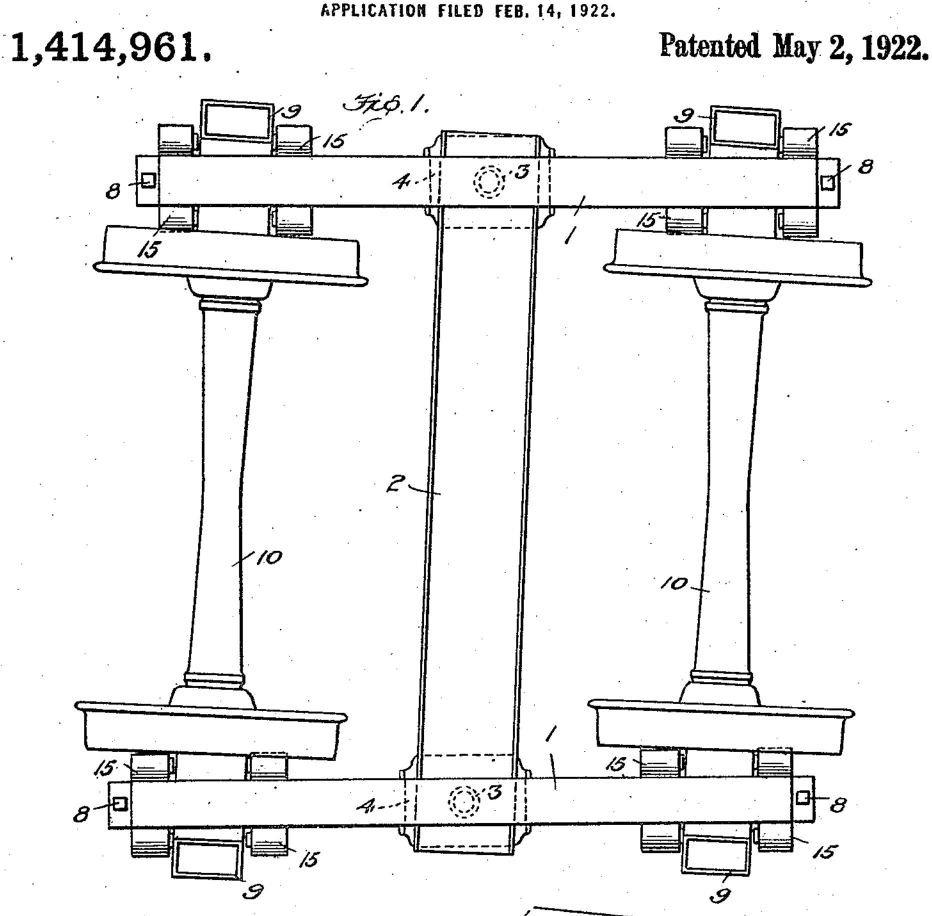
Figure 1 is a top plan view of a car truck embodying the invention, the bolster which is such as is ordinarily employed in flexible trucks, being omitted and the parts being illustrated in the angular relations they assume in passing around a curve.

In the form of my invention illustrated in the drawings, the truck includes the side frame members 1—1 connected for movement longitudinally of said truck by means of the transversely extending cross connecnection or spring plank 2. This cross connection 2 is pivotally connected to the opposite side frame members by means of vertically extending pivot bosses 3 formed on the latter and entering correspondingly shaped apertures or pivot bearings in the spring plank. If desired, the ends of the cross connecting means 2 may project into the bolster openings 4 in the side frame between the usual columns, sufficient clearance being provided, as in the case of the bolster, to permit the cross connecting member or spring plank 2 to turn through the required angle with respect to the side frames without coming into contact with or binding upon the latter.

Figures 2, 3, 4:
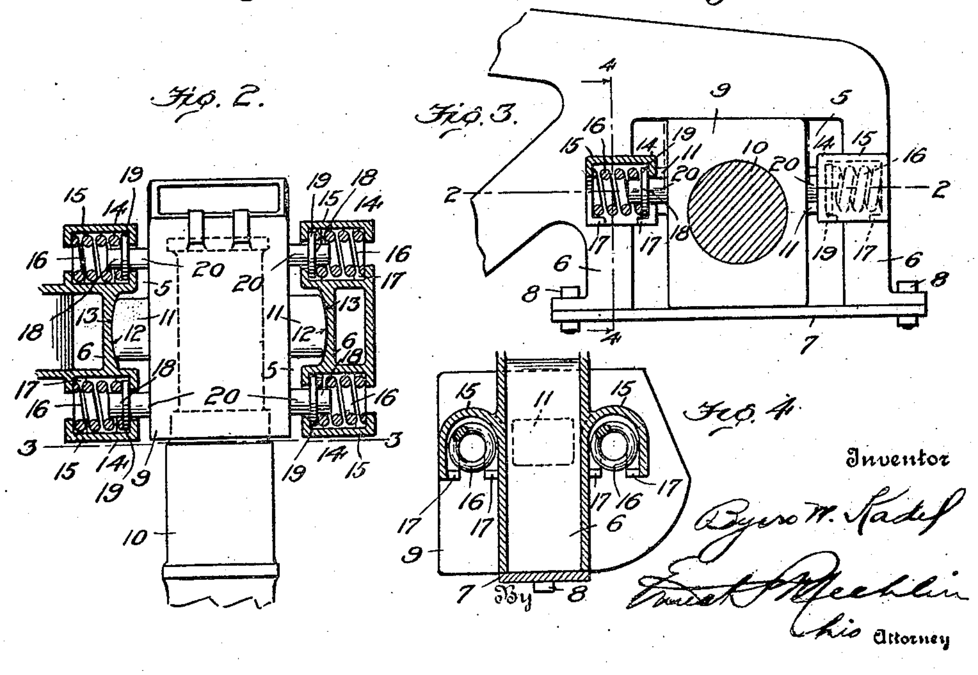
Figure 2 is a detail horizontal sectional view through an end of one side frame member showing the journal box swingingly mounted thereon and the associated yieldable devices interposed between said journal box and side frame member.
Figure 3 is a vertical sectional view with parts in elevation taken on the line 3—3 of Figure 2.
Figure 4 is a detail transverse sectional view on the line 4—4 of Figure 3, looking in the direction of the arrows.

The side frame members are provided at their ends with openings 5 formed between the vertical jaw-like portions 6, and a closure bar 7 bridging the ends of and attached to the jaw portions, as clearly shown in Figure 3. Flanges are provided on the jaws 6 and bolts 8 passing through said flanges serve to secure the bar 7 thereto, against the lower faces of said jaws.

Mounted within said openings 5 are journal boxes 9, each of which is of an approved type and includes among other things the usual brass wedge and lid. The ends of the axles 10 extend into their respective journal boxes and are designed to move said journal boxes according to the angular or deforming deflection of the axles when displaced from normal position. The angular movement of the journal box is substantially the same as that of the axle, and the movement of the side frames or axles when displaced from normal position is the direct cause of the journal box swinging within the respective openings of the side frames.

The movement of the journal box is of a pivotal nature, the swinging of said journal box being controlled about a pivotal point by means of coacting cylindrical surfaces provided on said journal box and the adjacent side frame member, respectively. Extensions 11 project from opposite sides of each journal box and are each provided at their outer ends with curved portions 12 described by an arc struck from a point within a plane centrally located of the journal box and forming a cylindrical mantle with a vertical line passing through said centrally located point.

Coacting, curved, or cylindrical portions 13 are formed upon the opposed inner side walls of the jaws 6, said portion being of sufficient width to permit movement of the extensions 11 of the journal box according to the maximum angular deflection for which the truck parts have been designed. The cylindrical portions 13 form relatively large seats for the extensions 11, which latter are loosely movable thereagainst, the said looseness permitting the changing of the vertical angular relations between the side frame member and journal box, as well as providing for the relatively free horizontal angular swinging of said parts.

The yieldable means for resisting the relative angular deflection of the journal box and side frame caused by the displacement movement, includes a series of spring devices 14 arranged upon opposite sides of the side frame adjacent the openings 5. Spring pockets 15 are preferably cast integral with the side frame member, the under side of the pockets being left open to permit of the insertion of the springs 16. The springs are assembled under initial compression and by further compressing the same they are forced past the retaining lips or flanges 17 into the pocket 15. When expanded within the pockets the said flanges 17 serve to prevent the dislodgment of the springs from operative position. Cooperating with each spring is a washer or follower 18 provided with a flange 19 which engages one end of the spring and a projecting pin 20 adapted to be actuated by the side walls of the journal box. The flange 19 serves as a means for limiting the projection of the pin 20 of the follower when the journal box moves out of contact therewith, thereby preventing any reaction upon the pivotal point, and at the same time permitting the opposite energized springs affected by the angular deflection to act in parallel and as a "couple" about the said pivot.

When a truck constructed in accordance with my invention is subjected to a force or shock causing the axle to change its angular relation with respect to said side frame members by reason of the latter moving longitudinally of the truck from normal position, the journal boxes movable with said axles also change their angular relation with respect to said side frames, and the yieldable spring devices are brought into operation for resisting said angular deflection. The shock or displacement movement is cushioned as the result of the resistance offered by oppositely acting springs associated with each journal box, the follower of one of the spring devices upon the outside of said side frame, and the follower of one of the spring devices upon the inner side of said side frame but upon the opposite side of the journal box, serving to energize the respective springs as the angle between the journal box and side frame is changed from normal position. The energized springs acting in parallel and in opposite directions about the pivotal connection between the side frame and journal box act to restore the side frames and associated parts to normal position upon cessation of the forces producing the displacement movement. The arrangement of the spring devices upon each side of each journal box provides for the operation of the yieldable means for any angular deflection. It will also be obvious that a particularly effective distribution of the yieldable means has been accomplished, and further that some relative independent action between the two axles and side frames can be obtained for cushioning any independent angular movement.

I prefer to support the journal boxes within the openings 5 upon the plate or bar 7 and in relatively close contact with the under face or wall of the side frame joining the jaw portions 6. The bar may be spring-like in action, thereby permitting some relative vertical movement between the extensions 11 of the journal box and the coacting cylindrical curved seats 13 constituting the relative loose pivotal connection hereinbefore described.

I claim:—

1. In a car truck, the combination with movable side frame members, of means connecting said side frame members adapted to permit relative longitudinal movement of the side frame members from normal position, car axles provided with journal boxes supported in said side frame members and movable with said axles, and yieldable means interposed between each journal box and the adjacent side frame member for resisting longitudinal displacement of either side frame member from normal position.

2. In a car truck, the combination with side frame members, of means connecting said side frame members adapted to permit relative longitudinal movement of the side frame members from normal position, journal boxes movably mounted in said side frame members, car axles having their ends extending into said journal boxes, said axles being adapted to move said journal boxes upon any angular deflection of the axle with respect to said side frame members, means for resisting said angular deflecting movement, and means for restoring said side frame members and axles to normal position.

3. In a car truck, the combination with side frame members, of means connecting said side frame members adapted to permit relative longitudinal movement of the side frame members from normal position, a car axle movably connected with said side frame members, journal boxes for said axle and movable therewith, and yieldable means interposed between the adjacent side frame member and each journal box for resisting angular deflection of said journal box with respect to said adjacent side frame member.

4. In a car truck, the combination with side frame members, of means connecting said side frame members adapted to permit relative longitudinal movement of the side frame members from normal position, car axles spanning said side frame members and adapted to be angularly displaced with relation thereto from normal position, and means operable between said axles and adjacent side frame member, said means acting to resist said angular displacement of the axles and relative longitudinal displacement of said side frame members from normal position.

5. In a car truck, the combination with side frame members, of means connecting said side frame members adapted to permit relative longitudinal movement of the side frame members from normal position, car axles spanning said side frame members, said axles being adapted to be angularly deflected from normal position with relation to the side frame members, and yieldable means operable between the axles and adjacent side frame member, said means acting to resist relative longitudinal displacement movement of the side frame members from normal position.

6. In a car truck, the combination with side frame members, of means connecting said side frame members adapted to permit relative longitudinal movement of the side frame members from normal position, car axles spanning said side frame members, said axles being adapted to be angularly deflected from normal position with relation to the side frame members, and yieldable means interposed between an adjacent side frame member and each axle for resisting relative longitudinal displacement of the side frame members from normal position, said yieldable means also serving to restore the side frame member to normal position.

7. In a car truck, the combination with side frame members, of means connecting said side frame members adapted to permit relative longitudinal movement of the side frame members from normal position, car axles spanning said side frame members and angularly movable with relation thereto upon displacement from normal position, journal boxes for said axles, said journal boxes being movable into the same angular position assumed by the axles upon displacement, and means including a spring operable between an adjacent side frame member and one of said journal boxes for resisting relative longitudinal displacement movement of said side frame member from normal position.

8. In a car truck, the combination with side frame members, of means connecting said side frame members adapted to permit relative longitudinal movement of the side frame members from normal position, car axles spanning said side frame members and angularly movable with relation thereto upon displacement from normal position, journal boxes for said axles, said journal boxes being movable into the same angular position assumed by the axles upon displacement, and means including a plurality of springs operable between an adjacent side frame member and journal box for resisting relative longitudinal displacement movement of said side frame member from normal position.

9. In a car truck, the combination with side frame members, of means connecting said side frame members adapted to permit relative longitudinal movement of the side frame members from normal position, car axles spanning said side frame members and angularly movable with relation thereto upon displacement from normal position, journal boxes for said axles, said journal boxes being movable into the same angular position assumed by the axles upon displacement, and yieldable means operable between an adjacent side frame member and each of said journal boxes for resisting relative longitudinal displacement movement of the side frame member from normal position, said yieldable means including springs operable against each side face of the journal boxes and adapted to be energized by said relative longitudinal displacement movement for restoring the side frame members to normal position upon cessation of the forces producing said displacement movement.

10. In a car truck, the combination with side frame members, of means connecting said side frame members adapted to permit relative longitudinal movement of the side frame members from normal position, car axles spanning said side frame members and angularly movable with relation thereto, journal boxes movably mounted in said side frame members and adapted to angle with said axles, and yieldable means carried by each side frame member and operable against said journal boxes for resisting displacement movement, said means including a plurality of springs each of which is assembled under initial compression.

11. In a car truck, the combination with side frame members, of means connecting said side frame members adapted to permit relative longitudinal movement of the side frame members from normal position, car axles spanning said side frame members and angularly movable with relation thereto, journal boxes movably mounted in said side frame members and adapted to angle with said axles, and yieldable means carried by each side frame member and operable against said journal boxes for resisting displacement movement, said means including a plurality of springs each assembled under initial compression, a housing for each spring and a follower associated with each spring and operable against said journal box and one wall of said housing.

12. In a car truck, the combination with side frame members each provided with an opening at the respective ends thereof, of a spring plank connecting said side frame members adapted to permit relative longitudinal movement of the side frame members from normal position, journal boxes angularly movable in said openings with respect to said frame members, car axles movable with said journal boxes, and spring devices arranged upon opposite sides of each journal box and operable against the side frame members adjacent the said openings therein, said spring devices being energized by relative longitudinal displacement movement and adapted to restore the side frame members to normal position.

13. In a car truck, the combination with side frame members each provided with an opening at the respective ends thereof, of a spring plank connecting said side frame members adapted to permit relative longitudinal movement of the side frame members from normal position, a plurality of oppositely disposed yieldable devices arranged upon each side of each side frame member adjacent each opening therein, each yieldable device including a spring and follower projecting therefrom, journal boxes movable in said openings of the side frame members between the oppositely disposed yieldable devices, and car axles angularly movable with relation to the side frame members, said car axles acting to move the journal boxes for energizing certain of the said oppositely disposed yieldable devices.

14. In a car truck, the combination with side frame members each provided with an opening at the respective ends thereof, of a spring plank connecting said side frame members adapted to permit relative longitudinal movement of the side frame members from normal position, a journal box adapted to pivot in each of said openings, a car axle having its ends extending into oppositely arranged journal boxes, said car axle being adapted to move the journal boxes into an angular position as the result of displacement movement, and yieldable means adapted to resist the pivotal movement of said journal boxes within the openings in said side frame members.

15. In a car truck, the combination with side frame members each having an opening therein, of a spring plank connecting said side frame members adapted to permit relative longitudinal movement of the side frame members from normal position, a journal box adapted to pivot in each of said side frame members, a car axle having its ends extending in the oppositely arranged journal boxes, said car axle being adapted to move the journal boxes into an angular position as the result of displacement movement, and yieldable means adapted to resist the pivotal movement of said journal boxes within said openings, said yieldable means including a plurality of springs acting as a couple.

16. In a car truck, the combination with side frame members each having an opening therein, of a spring plank connecting said side frame members adapted to permit relative longitudinal movement of the side frame members from normal position, a journal box adapted to pivot in each opening in said side frame members, a car axle having its ends extending into oppositely arranged journal boxes, said car axle being adapted to move the journal boxes into any angular position as the result of displacement movement, and means adapted to resist the pivotal movements of said journal boxes within each opening in said side frame members.

17. In a car truck, the combination with side frame members each having an opening therein, of a spring plank connecting said side frame members adapted to permit relative longitudinal movement of the side frame members from normal position, a journal box having curved surfaces adapted to fit within and pivot in each opening in said side frame members, a car axle adapted to move said journal box into an angular position with relation to said side frame members, and means for resisting the pivotal movement of said journal box within the opening in said side frame member.

18. In a car truck, the combination with axles and journal boxes therefor, of relatively longitudinal movable side frame members, and means yieldably interposed between an adjacent side frame member and each of said journal boxes, said means being operable against the sides of said journal boxes and adapted to be energized when said side frame members are moved out of normal position.

19. In a car truck, the combination with axles and journal boxes therefor, of relatively longitudinally movable side frame members, and yieldable means mounted on said side frame members and operable against the opposite sides of each journal box, said means being adapted to resist relative longitudinal displacement movement of the side frame members from normal position.

20. In a car truck, the combination with an axle and journal box, of a side frame member relatively movable longitudinally of said truck, and yieldable means operably positioned between said journal box and said frame member for resisting relative longitudinal displacement movement of said side frame member from normal position, said yieldable means acting to restore the side frame member to normal position upon cessation of the forces producing said displacement movement.

21. In a car truck, the combination with relatively longitudinally movable side frame members, of means including axles spanning said side frame members, journal boxes for the ends of said axles, said journal boxes being pivotally connected to the side frame members, and yieldable means operable between an adjacent side frame member and journal box for resisting relative longitudinal displacement movement of the side frame member from normal position, said means also acting to move said side frame member about the said pivotal connection when restoring said side frame members to normal position.

22. In a car truck, the combination with movable side frame members, of means connecting said side frame members adapted to permit relative longitudinal movement of said side frame members from normal position, car axles extending transversely of the truck and having journal boxes movable with said axles, means for movably supporting said journal boxes in said side frame members, and means operable between said journal boxes and adjacent side frame member for resisting relative longitudinal displacement movement of the latter from normal position.

In testimony whereof I affix my signature.

BYERS W. KADEL.